Dec. 12, 1967  D. R. FALKENBERG  3,357,292

TWO-PART THREADLESS FASTENER

Filed Feb. 23, 1965

INVENTOR.
DOUGLASS R. FALKENBERG
BY
Schramm, Kramer & Sturges
ATTORNEYS

United States Patent Office 3,357,292
Patented Dec. 12, 1967

3,357,292
TWO-PART THREADLESS FASTENER
Douglass R. Falkenberg, 20997 Westlake Road,
Rocky River, Ohio 44116
Filed Feb. 23, 1965, Ser. No. 434,181
7 Claims. (Cl. 85—8.8)

This invention relates, as indicated, to a fastening device, and more particularly to a fastening device composed of a threadless nut and a threadless bolt.

This invention is especially suited for lightweight fastening devices formed from lightweight materials, e.g., resilient plastic.

As previously indicated, the nut and bolt of this device do not depend on threadably engaged complementary parts to provide the necessary locking action, whereby the parts are secured together. The bolt is inserted into the nut and becomes engaged therein by new and novel locking means which will hereinafter be described.

This type of engagement is desirable for use with snap-on parts. For example, the bolt may be formed as part of a drapery holder, and the snap-on nut may be formed as part of a bracket, which is secured to a wall or framing adjacent a window or door opening. After the drapery material is folded or draped over the bracket, the holder is snapped into position, or locked against the bracket in overlying relation to the drapery, providing a decorative effect.

Briefly stated, this invention concerns a threadless nut and bolt which are locked together. The nut is characterized by an axial passageway extending through it. A collar is provided at one end of the passageway, and forms a restricted opening into the passageway. A wedge, traversing the passageway, is disposed in the passageway in spaced relation from the collar. The bolt is characterized by a pair of resilient enlarged fingers extending from its shank. The fingers define a wedge receiving slot between them. The slot extends into the shank of the bolt to allow the fingers to be compressed inwardly as they are inserted through the collar into the passageway. A finger passes on either side of the wedge as the nut and bolt are forced together. Inside the passageway, the fingers spring outwardly and interlock behind the collar, and the wedge is received in the slot. The wedge keeps the fingers in spaced relation, whereby they are not easily disengaged from the collar.

To the accomplishment of the foregoing and related ends, said invention, then, consists of the means hereinafter fully described and particularly pointed out in the appended claims, the following description and annexed drawings setting forth in detail certain illustrative embodiments of the invention, such disclosed means constituting, however, but a few of the various forms in which the principle of this invention may be employed.

Figure 1:
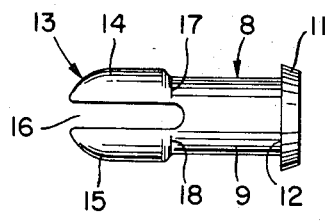
FIG. 1 is a side view of the threadless bolt of this invention.
Figure 2:
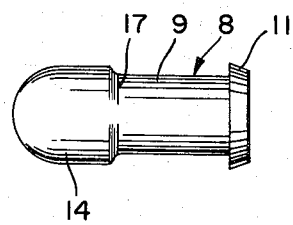
FIG. 2 is a top view of the bolt of FIG. 1.
Figure 3:
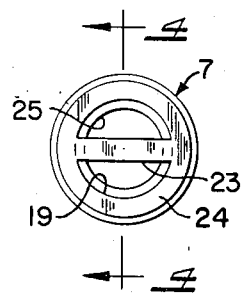
FIG. 3 is a top view of a nut designed for snap lock engagement with the bolt of FIG. 1.
Figure 4:
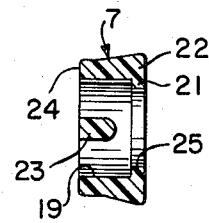
FIG. 4 is a cross sectional view of the nut as it appears in the plane indicated by the line 4—4 of FIG. 3.
Figure 5:
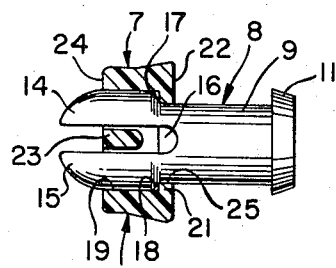
FIG. 5 is a side view of the bolt in interlocked engagement with the nut shown in cross section.

Referring more particularly to FIGS. 1–5, there is shown a fastening device, generally indicated at 6, which is composed of a threadless nut 7 and a threadless bolt 8.

The bolt 8 is, preferably, composed of an elongated cylindrical body or shank 9. A disc or head 11, of larger diameter, is secured to the body end 12. The other end or portion of the body, generally indicated at 13, is bifurcated, forming a pair of oppositely disposed resilient enlarged fingers 14 and 15.

Fingers 14 and 15 are separated by a wedge receiving slot 16 which, preferably, extends into the shank 9. Any suitable stop means may be provided at the juncture of the fingers 14 and 15 with the shank 9. In the embodiment shown, enlarged portions or stops 17 and 18, respectively, are formed at the proximal extremities of the fingers 14 and 15.

The nut 7 is, preferably, generally cylindrical in shape and has a passageway 19 extending therethrough. Any suitable means for engaging the stop means disposed on the bolt 8, when the bolt is inserted into the passageway, may be provided. In the embodiment shown, an annular constricting collar or abutment 21 is disposed in the passageway 19, adjacent end 22 of the nut 7. The collar 21, disposed in the passageway 19, forms a restricted opening 25 in the nut end 22.

Any suitable means may be provided in the passageway 19 for holding the fingers 14 and 15 in spaced relationship within the passageway 19. In the embodiment shown, a spacer bar or wedge 23, traversing the passageway 19, is disposed in the passageway 19 adjacent end 24 of the nut 7. The ends of the wedge 23 are secured to, and integral with, the walls forming the passageway 19.

In operation, the bifurcated end 13 of the bolt 8, is inserted through the restricted opening 25, and into the passageway 19 of the nut 7. The fingers 14 and 15 formed in the end 13, are compressed inwardly towards each other as they pass through the restricted opening 25 into the passageway 19. As the nut 7 and bolt 8 are forced together, the fingers 14 and 15 pass on opposite sides of the bar or wedge 23, and the wedge 23 is received in the slot 16.

Fingers 14 and 15, when they are fully received in the passageway 19, spring outwardly due to the resiliency of the material, and the enlarged portions 17 and 18 interlockingly engage behind the annular collar 21 to hold the fingers in the passageway 19. The wedge 23 maintains the fingers 14 and 15 in spaced relation so that they cannot be compressed inwardly, and the bolt 8 easily removed from the nut 7.

The extent of interlocking coaction between the enlarged portions 17 and 18 of fingers 14 and 15, respectively, and the collar depends on their relative size. For example, if it is desired to permanently lock the bolt and nut together, the depth or width of the abutting surfaces of the enlarged portions and relative to the collar would be greater, than where it is desired to provide a disconnectable juncture between the nut and the bolt.

Figure 6:
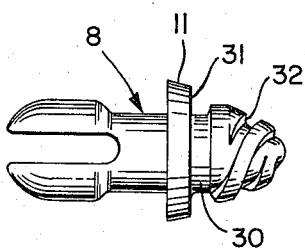
FIG. 6 is a side view of the threadless bolt of FIG. 1 having a threaded shank portion secured to its head.
Figure 7:
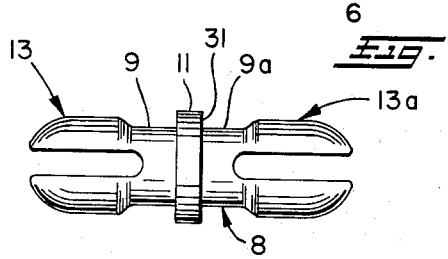
FIG. 7 is a side view of a threadless bolt having similarly configured ends employing embodiments of this invention.

Referring to FIGS. 6 and 7, there are shown two different embodiments of this invention. As seen in FIG. 6, another shank 30 extends from side 31 of the bolt head 11. Any suitable threads are formed in the shank 30, e.g. a single speed-lock thread 32. This embodiment of the invention has certain advantages from that shown in FIG. 1, for example, in the case of the previously mentioned bracket and drapery holder, the bolt in FIG. 1 is usually inserted through holes drilled in the bracket, and held in position until the drapery holder, having features of the threadless nut incorporated therein, is snapped or locked in position in surmounting relation to the bracket and material draped thereon. This necessitates the use of two hands one of which is working behind the bracket. Such conditions of assembly are improved when bolts having threaded ends are used. For example, the holes in the bracket are tapped, and the bolts are threadably engaged therein, the resilient fingers extending from the face of the bracket. After the drapery material is folded on the bracket, the drapery holder is snapped into position. There is no need for holding the bolts behind the brackets, as they are threadably locked to the brackets and easily discernible.

As shown in FIG. 7, a similar shank 9a having a similarly bifurcated end portion 13a, may be secured to, and extend from side 31 of the head 11 in place of the threaded shank 30. The bolt 8 is double acting, that is, a threadless nut (not shown) can be secured on either bifurcated end 13 and 13a, respectively. This embodiment is also well suited for improving the conditions of assembling a drapery holder to a bracket, as mentioned above.

As previously indicated, the principle of this invention may be applied to large heavy type fastening devices. The invention is, however, particularly designed for lightweight fastening devices formed from lightweight materials, e.g., plastic.

Thus, there has been provided a fastening device which is simply designed and economically manufactured.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A fastener comprising a threadless nut and bolt, said nut including:
   (a) an axial passageway;
   (b) an abutment forming a restricted opening into the passageway;
   (c) a wedge traversing the passageway in axial spaced relation from the abutment;
   and the bolt including:
   (d) a pair of spaced resilient fingers defining a slot for receiving the wedge, said fingers being insertable through the opening into the passageway a predetermined distance for interlocking engagement with the nut, said fingers being compressed towards each other as they by-pass the abutment to engage and by-pass the wedge; and
   (e) a stop carried by at least one of the fingers for interlocking engagement with the abutment when the fingers are inserted said predetermined distance into the passageway.

2. The fastener of claim 1, wherein the abutment includes a collar with a centrally disposed opening having a diameter smaller than the diameter of said axial passageway.

3. The fastener of claim 1, wherein the wedge is integrally formed with the nut and the thickness of the wedge is slightly smaller than the spacing between said fingers.

4. The fastener of claim 1, which includes a similar pair of resilient fingers extending in axial opposed relation from said other pair of fingers.

5. The fastener of claim 1, which includes a threaded shank portion extending in axial opposed relation from said pair of fingers.

6. The fastener of claim 1, wherein the nut and bolt are composed of plastic.

7. A fastener comprising a threadless nut and bolt, said nut including:
   (a) an axial passageway;
   (b) a collar forming a restricted opening into the passageway;
   (c) a wedge traversing the passageway in axial spaced relation from the collar;
   and the bolt including:
   (d) a pair of spaced resilient fingers defining a slot for receiving the wedge, said fingers being insertable through the opening into the passageway a predetermined distance for interlocking engagement with the nut, said fingers being compressed towards each other as they by-pass the collar to engage and by-pass the wedge; and
   (e) a stop carried by each of said fingers for interlocking engagement with the collar when the fingers are inserted said predetermined distance into the passageway.

References Cited

UNITED STATES PATENTS

| 934,982 | 9/1909 | Nesdall | 85—5 |
| 2,440,170 | 4/1948 | Duefrene. | |

WILLIAM FELDMAN, *Primary Examiner.*

E. SIMONSEN, *Assistant Examiner.*